United States Patent
Kim et al.

(10) Patent No.: US 8,277,644 B2
(45) Date of Patent: Oct. 2, 2012

(54) FILTERING DEVICE

(75) Inventors: Bong Kyu Kim, Daejeon (KR); Wan Joong Kim, Gyeonggi-do (KR); Gun Yong Sung, Daejeon (KR); Seon Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 275 days.

(21) Appl. No.: 12/835,230

(22) Filed: Jul. 13, 2010

(65) Prior Publication Data

US 2011/0068053 A1 Mar. 24, 2011

(30) Foreign Application Priority Data

Sep. 22, 2009 (KR) .................. 10-2009-0089566

(51) Int. Cl.
B01D 35/143 (2006.01)
B01D 29/58 (2006.01)

(52) U.S. Cl. .............. 210/85; 210/489; 210/497.01

(58) Field of Classification Search .......... 210/85, 210/95, 94, 338, 490–492, 497.01; 96/416
See application file for complete search history.

(56) References Cited

U.S. PATENT DOCUMENTS

| 2,174,769 A * | 10/1939 | White ............... 210/94 |
| 5,505,753 A * | 4/1996 | Heysek ............. 96/416 |
| 6,889,144 B2 | 5/2005 | Borkman et al. |
| 2006/0259273 A1 | 11/2006 | Goldberg |
| 2008/0202992 A1 | 8/2008 | Bridges et al. |

FOREIGN PATENT DOCUMENTS

| JP | 05-168827 A | 7/1993 |
| JP | 08-152242 A | 6/1996 |
| JP | 2004-200402 A | 7/2004 |
| KR | 10-0355352 B1 | 9/2002 |
| KR | 2005-0022509 A | 3/2005 |
| KR | 2007-0113180 A | 11/2007 |
| KR | 2009-0016946 A | 2/2009 |

* cited by examiner

*Primary Examiner* — Terry Cecil
(74) *Attorney, Agent, or Firm* — Rabin & Berdo, P.C.

(57) ABSTRACT

Provided is a filtering device including a filter part having a plurality of filters stacked to filter contaminants in fluid, and a sample part disposed on an outer plane of the filter part and having a plurality of samples corresponding to the filters, respectively. Therefore, a filter exchange period can be accurately determined by measuring properties of the filter varied during filtering of contaminants, and indiscriminate exchange of the filters can be prevented to reduce maintenance cost.

13 Claims, 3 Drawing Sheets

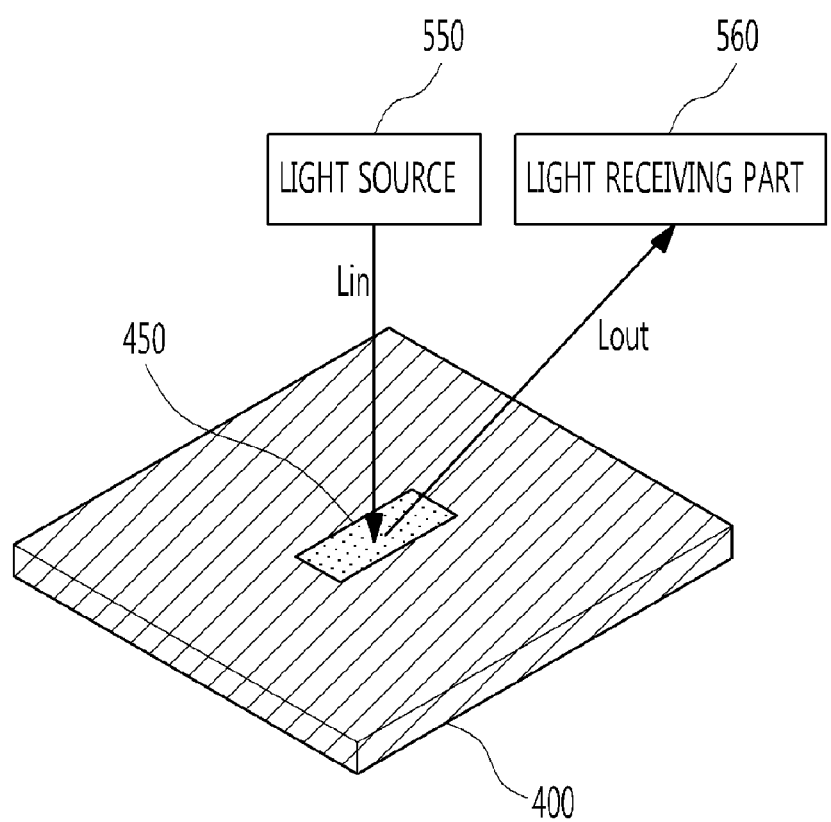

FILTERING DEVICE

CROSS-REFERENCE TO RELATED APPLICATION

This application claims the benefit of Korean Patent Application No. 10-2009-0089566, filed Sep. 22, 2009, the disclosure of which is hereby incorporated herein by reference in its entirety.

BACKGROUND

1. Field of the Invention

The present invention relates to a filtering device, and more particularly, to a smart filter capable of self-measuring an exchange period.

2. Discussion of Related Art

In general, filters are used for apparatus such as air conditioners, air purifiers, automobiles, etc., for filtering air, and water purifiers, refrigerators, etc., for filtering water.

Air filters or water filters are provided to remove harmful components, dust, particles, etc., contained in external air or water. However, when these filters are used for a long time, a large amount of dust or particles is accumulated so that filtering performance is decreased and bad odors are emitted due to mold, etc. In order to solve this problem, the filter must be exchanged with a new one when the dust or particles are accumulated to a certain amount or more. Currently used filters have a function of informing a user of an exchange period when a certain time elapses, regardless of the amount of the actually accumulated dust or particles.

In the case of a system in which a filter is exchanged when a certain time elapses, the filter is exchanged when the certain time elapses, regardless of a use habit or an operation time of the filter, and thus the exchange of the filter may be irrelevant to an actual lifespan of the filter.

In addition, in the case of an apparatus in which an exchange period of a filter is determined by measuring a lifespan of the filter, since the lifespan of the filter is determined by external environment such as a pressure applied to the filter, etc., rather than the lifespan of the filter itself, the filter may be indiscriminately exchanged, increasing maintenance cost.

SUMMARY OF THE INVENTION

The present invention is directed to a filtering device capable of precisely measuring a filter exchange period by measuring characteristics of the filter itself varied during filtering of contaminants According to one aspect of the present invention, a filtering device includes a filter part having a plurality of filters stacked to filter contaminants in fluid, and a sample part disposed on an outer plane of the filter part and having a plurality of samples corresponding to the filters, respectively.

In some embodiments, the device may further include a detection part for periodically detecting a contamination level of the sample part and determining an exchange time of the filter part.

The sample part may have the plurality of samples formed of the same materials as the filters of the filter part, respectively.

The samples may be surface-treated to adsorb the same contaminants as the corresponding filters.

The detection part may periodically measure electrical properties such as resistance, electrical conductivity, etc., of the samples.

The detection part may read a contamination level according to the electrical properties such as resistance, electrical conductivity, etc., of the samples.

The detection part may include a light source for periodically irradiating light to the samples, and a light receiving part for receiving the light reflected from the samples.

The light receiving part may read chromaticity of the light according to colors of the samples from the reflected light.

The light receiving part may read the intensity of radiation of the light according to colors of the samples from the reflected light.

The detection part may alarm of an exchange time when the contamination level exceeds a critical value.

The detection part may alarm of the exchange time of each filter of the filter part.

The filter part may have a cylindrical structure in which the plurality of filters having different diameters are stacked.

The filter part may be formed by stacking the plurality of filters on a plane.

BRIEF DESCRIPTION OF THE DRAWINGS

The above and other features of the present invention will be described in reference to certain exemplary embodiments thereof with reference to the attached drawings in which:

FIG. 5 is a perspective view of a second embodiment of a detection part of the present invention.

DETAILED DESCRIPTION OF EXEMPLARY EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Throughout this specification, when an element is referred to as "comprises," "includes," or "has" a component, it does not preclude another component but may further include the other component unless the context clearly indicates otherwise.

Figure 1:
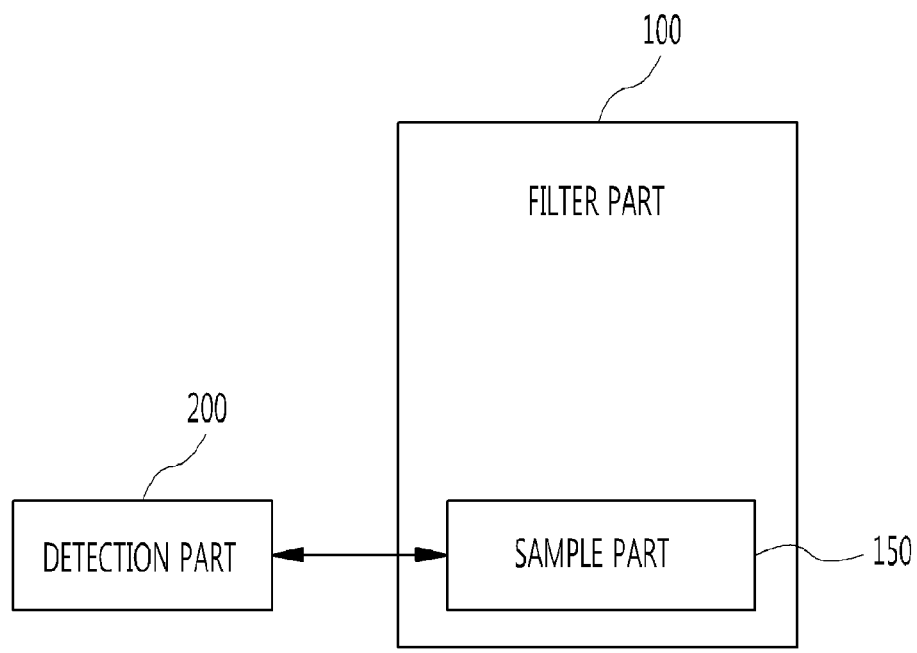
FIG. 1 is a block diagram of a filtering device in accordance with the present invention.
Figure 2:
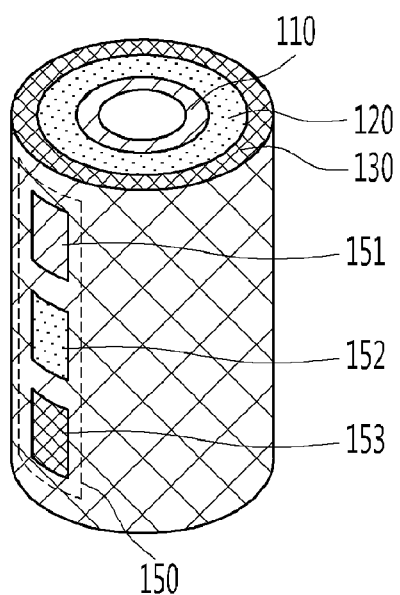
FIG. 2 is a perspective view of a filter in accordance with a first exemplary embodiment of the present invention.
Figure 3:
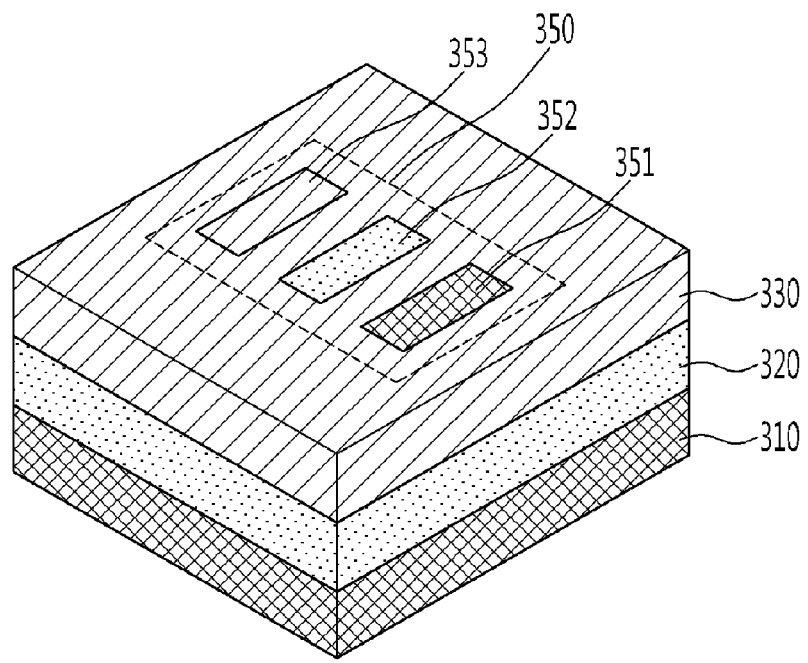
FIG. 3 is a perspective view of a filter in accordance with a second exemplary embodiment of the present invention.

FIG. 1 is a block diagram of a filtering device in accordance with the present invention, FIG. 2 is a perspective view of a filter in accordance with a first exemplary embodiment of the present invention, and FIG. 3 is a perspective view of a filter in accordance with a second exemplary embodiment of the present invention.

Referring to FIG. 1, the filtering device in accordance with the present invention includes a filter part 100 and a sample part 150, and may further include a detection part 200.

The filter part 100 includes a plurality of filters for filtering gas or liquid, for example, fluid such as water or air.

The plurality of filters are made by performing chemical treatment to adsorb a target material onto a surface of a porous material such as non-woven fabric, etc., the filters being chemically treated with different materials according to the target materials, respectively. Here, the target materials include heavy metals, dust, particles, and other harmful materials contained in water or air.

The sample part 150 is formed at a surface of the outermost filter of the plurality of filters exposed to the exterior thereof.

The filter part 100 and the sample part 150 will be constituted as shown in FIG. 2.

Referring to FIG. 2, the filter part 100 is constituted by cylindrical filters 110, 120 and 130 having different diameters, which overlap to form a single cylindrical structure.

The filter part 100 has a plurality of filters, for example, three filters 110, 120 and 130 overlapping each other as shown in FIG. 2. First to third filters 110, 120 and 130 having predetermined thicknesses are disposed from inside to outside.

The first to third filters 110, 120 and 130 are surface-treated in different manners to adsorb different contaminants in fluid as target materials to purify the fluid.

Here, the sample part 150 is formed at the surface of the third filter 130 disposed at the outermost side. The sample part 150 includes first, second and third samples 151, 152 and 153 formed of the same materials as the first, second and third filters 110, 120 and 130.

When the first to third filters 110, 120 and 130 filter fluid, the sample part 150 adsorbs target materials in the fluid while the fluid passes therethrough.

That is, the first sample 151 adsorbs the same target material as the first filter 110 through the same surface treatment, the second sample 152 adsorbs the same target material as the first filter 120 through the same surface treatment, and the third sample 153 adsorbs the target material as the third filter 130 through the same surface treatment.

The sample part 150 attached to the outer surface of the filter part 100 may be formed of the same non-woven fabric as the filters 110, 120 and 130, or may be formed of a surface-treated filtering material mounted on a substrate such as glass, etc., in a chip shape.

Here, the first to third samples 151, 152 and 153 may be disposed in a horizontal or vertical direction with respect to the filters.

Meanwhile, when the filter part 100 includes a stack structure of filters 310, 320 and 330 stacked on a plane as shown in FIG. 3, the sample part 150 may be formed on a surface of the uppermost filter 330 exposed to the exterior.

The sample part 350 includes first to third samples 351, 352 and 353 formed of the same materials as the filters 310, 320 and 330 stacked as shown in FIG. 3. The first to third samples 351, 352 and 353 are sequentially or arbitrarily disposed on a plane.

Disposition of the sample part 150 of the present invention is not limited to FIG. 2 or 3. The sample part 150 may be formed on the surface of the filter part 100 such that fluid can simultaneously pass through the filter part 100 and the sample part 150.

Since the filter part 100 and the sample part 150 adsorb harmful materials or target materials such as dust, etc., present in fluid according to fluid flow, respectively, an adsorption quantity is increased to exceed a critical value as time elapses. In this case, since the filter part 100 cannot be appropriately operated, the filter part 100 must be exchanged with a new one.

As described above, in order to inspect an exchange time of the filter part 100, the filtering device in accordance with the present invention includes a detection part 200 for inspecting each sample of the sample part 150 to determine an exchange time of the filter corresponding to the sample.

Hereinafter, an exchange time determination operation using the detection part 200 will be described with reference to FIGS. 4 and 5.

Figure 4:
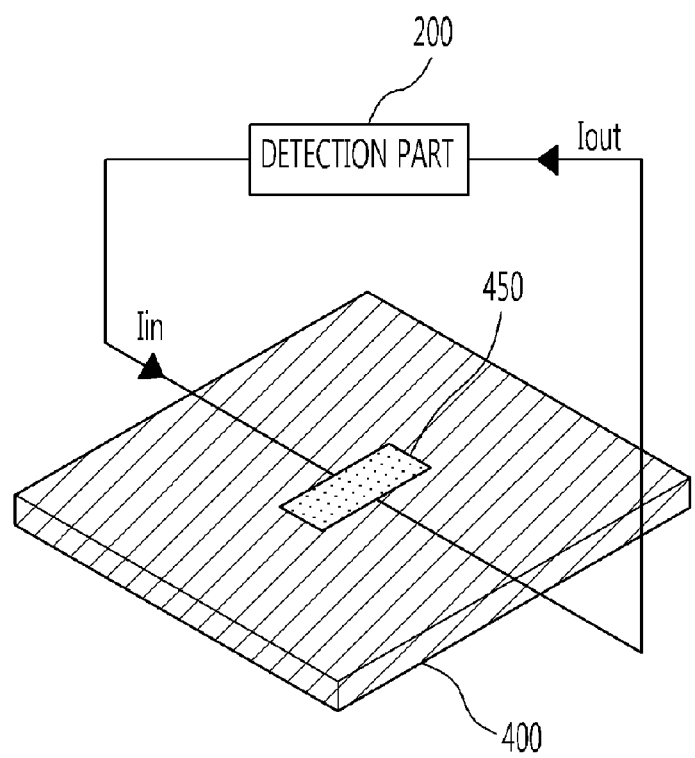
FIG. 4 is a perspective view of a first embodiment of a detection part of the present invention.

FIG. 4 is a perspective view of a first embodiment of a detection part of the present invention, and FIG. 5 is a perspective view of a second embodiment of a detection part of the present invention.

As shown in FIG. 4, a detection part 200 in accordance with the present invention is connected to a sample part 450 to measure variation in electrical properties such as resistance, electrical conductivity, permittivity, etc., of the sample part 450.

The detection part 200 is connected to each sample (not shown) of the sample part 450 on the filter part 400 via a wire, supplies a certain input current $I_{in}$ to each sample of the sample part 450, and reads an output current $I_{out}$ passed through the sample to measure electrical properties such as resistance, etc., of the sample part 450.

Chromaticity and resistance of each sample of the sample part 450 are varied depending on an adsorption quantity of the target material as time elapses.

Therefore, a contamination level of the sample can be read by measuring variation in electrical properties such as resistance, etc., of each sample of the sample part 450.

Here, the detection part 200 stores a relation table between resistance values of samples and contamination levels of the samples or contamination levels of corresponding filters, and critical values of the contamination levels, which can be obtained by experiments.

The detection part 200 periodically supplies an input current $I_{in}$ to the sample part 450 to read a resistance value of each sample, and finds a corresponding contamination level from the relation table to alarm of an exchange time when the contamination level exceeds a critical value.

Here, the filtering device using the plurality of filters separately alarms of an exchange time of each filter according to a contamination level of each filter, increasing a lifespan of the filter and preventing unnecessary exchange thereof.

Meanwhile, the second embodiment of the detection part of the present invention may include a light source 550 and a light receiving part 560, as shown in FIG. 5.

When the detection part 200 includes the light source 550 and the light receiving part 560, the detection part 200 measures a contamination level according to variation in color or variation in intensity of radiation of the sample part 450 on the filter part 400 to alarm of an exchange time.

If the variation in color of the sample part 450 can be checked with the naked eye, the detection part 200 may be unnecessary.

When the light source 550 irradiates certain light to the sample part 450, light having different chromaticity is reflected by the light receiving part 560 according to change in color of each sample.

The target material is adsorbed to the sample, changing the color of the sample. As a result, when white light enters the sample, a wavelength of absorbed light is varied, and thus, chromaticity of the light reflected by the sample and arriving at the light receiving part 560 is also varied.

The light receiving part 560 includes a plurality of optical color filters and an optical detector. The light receiving part 560 transmits the reflected light to the plurality of optical color filters, and then, measures variation in luminous intensity through the optical detector to measure chromaticity and intensity of radiation.

The detection part 200 reads a contamination level of each sample according to chromaticity or intensity of radiation of the light entering the light receiving part 560, and alarms of an exchange time of a corresponding filter when a contamination level exceeds a critical value.

Here, when a contamination level is read by chromaticity, the light source 550 may emit visible light, and when a contamination level is read by intensity of radiation, the light source 550 may emit visible light or ultraviolet light.

When the light source 550 irradiates visible light, an electric bulb, natural light, a light emitting diode (LED), etc., may be used. When the light source 550 irradiates ultraviolet light, an ultraviolet LED, etc., may be used to irradiate ultraviolet light to the sample part 150 and the filter part 100 to sterilize the sample part 150 and the filter part 100.

As described above, by providing the sample part 150 having the same material as the filter in the filtering device and measuring a current state of the sample 150 to calculate a lifespan of the filter, it is possible to measure lifespan of filters in the filter part stacked as plural layers to separately alarm of an exchange time of each filter.

Therefore, the sample part 150 formed on the surface of the filtering device can be read to determine a contamination level of the inside filters, in which measurement of the contamination level is difficult, and each filter can be exchanged separately.

As can be seen from the foregoing, a filter exchange period can be accurately determined by measuring properties of a filter varied during filtering of contaminants, and indiscriminate exchange of the filters can be prevented to reduce maintenance cost.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A filtering device comprising:
   a filter part having a plurality of filters stacked to filter contaminants in fluid; and
   a sample part disposed on an outer plane of the filter part and having a plurality of samples corresponding to the filters, respectively.

2. The filtering device according to claim 1, further comprising a detection part for periodically detecting a contamination level of the sample part and determining an exchange time of the filter part.

3. The filtering device according to claim 2, wherein the detection part periodically measures electrical properties such as resistance, and electrical conductivity of the samples.

4. The filtering device according to claim 3, wherein the detection part reads a contamination level according to the electrical properties such as resistance and electrical conductivity of the samples.

5. The filtering device according to claim 2, wherein the detection part comprises:
   a light source for periodically irradiating light to the samples; and
   a light receiving part for receiving the light reflected from the samples.

6. The filtering device according to claim 5, wherein the light receiving part reads chromaticity of the light according to colors of the samples from the reflected light.

7. The filtering device according to claim 5, wherein the light receiving part reads the intensity of radiation of the light according to colors of the samples from the reflected light.

8. The filtering device according to claim 2, wherein the detection part alarms of an exchange time when the contamination level exceeds a critical value.

9. The filtering device according to claim 8, wherein the detection part alarms of the exchange time of each filter of the filter part.

10. The filtering device according to claim 1, wherein the sample part has the plurality of samples formed of the same materials as the filters of the filter part, respectively.

11. The filtering device according to claim 10, wherein the samples are surface-treated to adsorb the same contaminants as the corresponding filters.

12. The filtering device according to claim 1, wherein the filter part has a cylindrical structure in which the plurality of filters having different diameters are stacked.

13. The filtering device according to claim 1, wherein the filter part is formed by stacking the plurality of filters on a plane.

* * * * *